US008035057B2

(12) United States Patent
Lee et al.

(10) Patent No.: US 8,035,057 B2
(45) Date of Patent: Oct. 11, 2011

(54) MICROWAVE PLASMA NOZZLE WITH ENHANCED PLUME STABILITY AND HEATING EFFICIENCY

(75) Inventors: Sang Hun Lee, San Ramon, CA (US); Jay Joongsoo Kim, Los Altos, CA (US)

(73) Assignees: Amarante Technologies, Inc., Santa Clara, CA (US); Saian Corporation, Wakayama (JP)

( * ) Notice: Subject to any disclaimer, the term of this patent is extended or adjusted under 35 U.S.C. 154(b) by 1312 days.

(21) Appl. No.: 11/631,723

(22) PCT Filed: Jul. 7, 2005

(86) PCT No.: PCT/US2005/023886

§ 371 (c)(1), (2), (4) Date: Jan. 4, 2007

(87) PCT Pub. No.: WO2006/014455

PCT Pub. Date: Feb. 9, 2006

(65) Prior Publication Data

US 2008/0017616 A1 Jan. 24, 2008

(51) Int. Cl.
*B23K 10/00* (2006.01)

(52) U.S. Cl. ............ 219/121.48; 219/121.52; 219/121.5

(58) Field of Classification Search ............. 219/121.52, 219/121.48, 121.5, 121.51; 118/723 R
See application file for complete search history.

(56) References Cited

U.S. PATENT DOCUMENTS 3,911,318 A 10/1975 Spero et al.
4,151,034 A 4/1979 Yamamoto et al.
4,185,213 A 1/1980 Scannell
4,609,808 A 9/1986 Bloyet et al.
4,611,108 A 9/1986 Leprince et al.
4,652,723 A 3/1987 Salinier et al.
4,711,627 A 12/1987 Oeschsle et al.
5,083,004 A 1/1992 Wells et al.
5,114,770 A 5/1992 Echizen et al.
5,349,154 A 9/1994 Harker et al.
5,565,118 A 10/1996 Asquith
(Continued)

FOREIGN PATENT DOCUMENTS

CN 2704179 6/2005
(Continued)

OTHER PUBLICATIONS

U.S. Appl. No. 11/631,723, filed Jan. 4, 2007, Lee et al.

(Continued)

*Primary Examiner* — Mark Paschall
(74) *Attorney, Agent, or Firm* — Jordan and Hamburg LLP

(57) ABSTRACT

Systems and methods for generating microwave plasma are disclosed. The present invention provides a microwave plasma nozzle (26) that includes a gas flow tube (40), and a rod-shaped conductor (34) that is disposed in the gas flow tube (40) and has a tip (33) near the outlet of the gas flow tube (40). A portion (35) of the rod-shaped conductor (34) extends into a microwave cavity (24) to receive microwaves passing in the cavity (24). These received microwaves are focused at the tip (33) to heat the gas into plasma. The microwave plasma nozzle (26) also includes a vortex guide (36) between the rod-shaped conductor (34) and the gas flow tube (40) imparting a helical shaped flow direction to the gas flowing through the tube (40). The microwave plasma nozzle (26) further includes a shielding mechanism (108) for reducing a microwave power loss through the gas flow tube (40).

66 Claims, 11 Drawing Sheets

U.S. PATENT DOCUMENTS

| | | | |
|---|---|---|---|
| 5,645,796 | A | 7/1997 | Caputo et al. |
| 5,679,167 | A | 10/1997 | Muehlberger |
| 5,689,949 | A | 11/1997 | DeFreitas et al. |
| 5,793,013 | A | 8/1998 | Read et al. |
| 5,972,302 | A | 10/1999 | Tranquilla et al. |
| 5,994,663 | A | 11/1999 | Lu |
| 6,039,834 | A | 3/2000 | Tanaka et al. |
| 6,125,859 | A | 10/2000 | Kao et al. |
| 6,157,867 | A | 12/2000 | Hwang et al. |
| 6,230,652 | B1 | 5/2001 | Tanaka et al. |
| 6,262,386 | B1 | 7/2001 | Foernsel |
| 6,388,225 | B1 | 5/2002 | Bluem et al. |
| 6,417,013 | B1 | 7/2002 | Teixeira et al. |
| 6,525,481 | B1 | 2/2003 | Kilma et al. |
| 6,673,200 | B1 | 1/2004 | Gu et al. |
| 6,734,385 | B1 | 5/2004 | Bark et al. |
| 7,164,095 | B2 | 1/2007 | Lee et al. |
| 7,338,575 | B2 | 3/2008 | Pingree, Jr. et al. |
| 7,554,054 | B2 | 6/2009 | Takada et al. |
| 2001/0024114 | A1 | 9/2001 | Kitagawa et al. |
| 2002/0020691 | A1 | 2/2002 | Jewett et al. |
| 2002/0050323 | A1 | 5/2002 | Moisan et al. |
| 2003/0000823 | A1 | 1/2003 | Uhm et al. |
| 2003/0032207 | A1 | 2/2003 | Rengarajan et al. |
| 2003/0085000 | A1 | 5/2003 | Horioka et al. |
| 2003/0178140 | A1 | 9/2003 | Hamazaki et al. |
| 2003/0199108 | A1 | 10/2003 | Tanaka et al. |
| 2004/0007326 | A1 | 1/2004 | Roche et al. |
| 2004/0016402 | A1 | 1/2004 | Walther et al. |
| 2004/0079287 | A1 | 4/2004 | Smith et al. |
| 2004/0083797 | A1 | 5/2004 | Ward et al. |
| 2004/0173583 | A1 | 9/2004 | Iriyama et al. |
| 2004/0262268 | A1 | 12/2004 | Wu |
| 2006/0006153 | A1 | 1/2006 | Lee et al. |
| 2006/0021581 | A1 | 2/2006 | Lee et al. |
| 2006/0021980 | A1 | 2/2006 | Lee et al. |
| 2006/0042546 | A1 | 3/2006 | Ishii et al. |
| 2006/0057016 | A1 | 3/2006 | Kumar et al. |
| 2007/0221634 | A1 | 9/2007 | Condick |
| 2008/0017616 | A1 | 1/2008 | Lee et al. |
| 2008/0029030 | A1 | 2/2008 | Goto et al. |
| 2008/0073202 | A1 | 3/2008 | Lee et al. |
| 2008/0093358 | A1 | 4/2008 | Lee et al. |
| 2010/0201272 | A1 | 8/2010 | Lee |

FOREIGN PATENT DOCUMENTS

| | | |
|---|---|---|
| CN | 101137267 | 3/2008 |
| EP | 0 397 468 | 11/1990 |
| JP | 60-046029 | 3/1985 |
| JP | 60-502243 | 12/1985 |
| JP | 62-81274 | 4/1987 |
| JP | 62-228482 | 10/1987 |
| JP | EP-0 397 468 | 11/1990 |
| JP | 3-075318 | 3/1991 |
| JP | 5-146879 | 6/1993 |
| JP | 6-013329 | 1/1994 |
| JP | 6-244140 | 9/1994 |
| JP | 7-135196 | 5/1995 |
| JP | 7-258828 | 10/1995 |
| JP | 9-169595 | 6/1997 |
| JP | 10-284296 | 10/1998 |
| JP | 2001-044177 | 2/2001 |
| JP | 2001-502110 | 2/2001 |
| JP | 2001-068298 | 3/2001 |
| JP | 2002-124398 | 4/2002 |
| JP | 2003-033862 | 2/2003 |
| JP | 2003-059917 | 2/2003 |
| JP | 2003-086580 | 3/2003 |
| JP | 2003-133302 | 5/2003 |
| JP | 2003-167017 | 6/2003 |
| JP | 2003-171785 | 6/2003 |
| JP | 2003-197397 | 7/2003 |
| JP | 2003-213414 | 7/2003 |
| JP | 2004-006211 | 1/2004 |
| JP | 2004-237321 | 8/2004 |
| JP | 2004-285187 | 10/2004 |
| JP | 2005-002355 | 1/2005 |
| JP | 2005-095744 | 4/2005 |
| JP | 2005-116217 | 4/2005 |
| JP | 2005-235464 | 9/2005 |
| JP | 2005-534187 | 11/2005 |
| JP | 2006-121073 | 5/2006 |
| JP | 2007-530955 | 11/2007 |
| JP | 2008-508683 | 3/2008 |
| KR | 2006-000194 | 1/2006 |
| WO | WO-2004-017046 | 1/2004 |
| WO | WO-2005/096681 | 10/2005 |
| WO | WO-2006/014862 | 2/2006 |

OTHER PUBLICATIONS

U.S. Appl. No. 11/661,048, filed Feb. 22, 2007, Lee et al.
U.S. Appl. No. 11/661,067, filed Feb. 22, 2007, Lee et al.
U.S. Appl. No. 12/284,570, filed Sep. 23, 2008, Lee.
U.S. Appl. No. 12/291,646, filed Nov. 12, 2008, Lee.
U.S. Appl. No. 12/315,913, filed Dec. 8, 2008, Lee.
U.S. Appl. No. 12/322,909, filed Feb. 9, 2009, Lee.
U.S. Appl. No. 12/380,835, filed Mar. 4, 2009, Lee.
U.S. Appl. No. 12/384,536, filed Apr. 6, 2009, Lee et al.
U.S. Appl. No. 12/386,578, filed Apr. 21, 2009, Lee et al.

MICROWAVE PLASMA NOZZLE WITH ENHANCED PLUME STABILITY AND HEATING EFFICIENCY

BACKGROUND OF THE INVENTION

1. Field of the Invention

The present invention relates to plasma generators, and more particularly to devices having a nozzle that discharges a plasma plume which can be generated using microwaves.

2. Discussion of the Related Art

In recent years, the progress on producing plasma has been increasing. Typically, plasma consists of positive charged ions, neutral species and electrons. In general, plasmas may be subdivided into two categories: thermal equilibrium and thermal non-equilibrium plasmas. Thermal equilibrium implies that the temperature of all species including positive charged ions, neutral species, and electrons, is the same.

Plasmas may also be classified into local thermal equilibrium (LTE) and non-LTE plasmas, where this subdivision is typically related to the pressure of the plasmas. The term "local thermal equilibrium (LTE)" refers to a thermodynamic state where the temperatures of all of the plasma species are the same in the localized areas in the plasma.

A high plasma pressure induces a large number of collisions per unit time interval in the plasma, leading to sufficient energy exchange between the species comprising the plasma, and this leads to an equal temperature for the plasma species. A low plasma pressure, on the other hand, may yield one or more temperatures for the plasma species due to insufficient collisions between the species of the plasma.

In non-LTE, or simply non-thermal plasmas, the temperature of the ions and the neutral species is usually less than 100° C., while the temperature of electrons can be up to several tens of thousand degrees in Celsius. Therefore, non-LTE plasma may serve as highly reactive tools for powerful and also gentle applications without consuming a large amount of energy. This "hot coolness" allows a variety of processing possibilities and economic opportunities for various applications. Powerful applications include metal deposition system and plasma cutters, and gentle applications include plasma surface cleaning systems and plasma displays.

One of these applications is plasma sterilization, which uses plasma to destroy microbial life, including highly resistant bacterial endospores. Sterilization is a critical step in ensuring the safety of medical and dental devices, materials, and fabrics for final use. Existing sterilization methods used in hospitals and industries include autoclaving, ethylene oxide gas (EtO), dry heat, and irradiation by gamma rays or electron beams. These technologies have a number of problems that must be dealt with and overcome and these include issues as thermal sensitivity and destruction by heat, the formation of toxic byproducts, the high cost of operation, and the inefficiencies in the overall cycle duration. Consequently, healthcare agencies and industries have long needed a sterilizing technique that could function near room temperature and with much shorter times without inducing structural damage to a wide range of medical materials including various heat sensitive electronic components and equipment.

These changes to new medical materials and devices have made sterilization very challenging using traditional sterilization methods. One approach has been using a low pressure plasma (or equivalently, a below-atmospheric pressure plasma) generated from hydrogen peroxide. However, due to the complexity and the high operational costs of the batch process units needed for this process, hospitals use of this technique has been limited to very specific applications. Also, low pressure plasma systems generate plasmas having radicals that are mostly responsible for detoxification and partial sterilization, and this has negative effects on the operational efficiency of the process.

It is also possible to generate an atmospheric plasma such as for treating surfaces, such as pre-treatment of plastic surfaces. One method of generating an atmospheric plasma is taught by U.S. Pat. No. 6,677,550 (Förnsel et al.). Förnsel et al. disclose a plasma nozzle in FIG. 1, where a high-frequency generator applies high voltage between a pin-shaped electrode 18 and a tubular conducting housing 10. Consequently, an electric discharge is established therebetween as a heating mechanism. Förnsel et al. as well as the other existing systems that use a high voltage AC or a Pulsed DC to induce an arc within a nozzle and/or an electric discharge to form a plasma has various efficiency drawbacks. This is because the initial plasma is generated inside the nozzle and it is guided by the narrow slits. This arrangement allows some of the active radicals to be lost inside the nozzle. It also has other problems in that this nozzle design has a high power consumption and produces a high temperature plasma.

Another method of generating an atmospheric plasma is described in U.S. Pat. No. 3,353,060 (Yamamoto et al.). Yamamoto et al disclose a high frequency discharge plasma generator where high frequency power is supplied into an appropriate discharge gas stream to cause high-frequency discharge within this gas stream. This produces a plasma flame of ionized gas at an extremely high temperature. Yamamoto et al. uses a retractable conductor rod 30 and the associated components shown in FIG. 3 to initiate plasma using a complicated mechanism. Yamamoto et al. also includes a coaxial waveguide 3 that is a conductor and forms a high-frequency power transmission path. Another drawback of this design is that the temperature of ions and neutral species in the plasma ranges from 5,000 to 10,000° C., which is not useful for sterilization since these temperatures can easily damage the articles to be sterilized.

Using microwaves is one of the conventional methods for generating plasma. However, existing microwave techniques generate plasmas that are not suitable, or at best, highly inefficient for sterilization due to one or more of the following drawbacks: their high plasma temperature, a low energy field of the plasma, a high operational cost, a lengthy turnaround time for sterilization, a high initial cost for the device, or they use a low pressure (typically below atmospheric pressure) using vacuum systems. Thus, there is a need for a sterilization system that: 1) is cheaper than currently available sterilization systems, 2) uses nozzles that generate a relatively cool plasma and 3) operates at atmospheric pressure so no vacuum equipment is needed.

SUMMARY OF THE INVENTION

The present invention provides various systems and methods for generating a relatively cool microwave plasma using atmospheric pressure. These systems have a low per unit cost and operate at atmospheric pressure with lower operational costs, lower power consumption and a short turnaround time for sterilization. A relatively cool microwave plasma is produced by nozzles which operate, unlike existing plasma generating systems, at atmospheric pressure with an enhanced operational efficiency.

As opposed to low pressure plasmas associated with vacuum chambers, atmospheric pressure plasmas offer a number of distinct advantages to users. Atmospheric pressure plasma systems use compact packaging which makes the system easily configurable and it eliminates the need for highly priced vacuum chambers and pumping systems. Also, atmospheric pressure plasma systems can be installed in a variety of environments without needing additional facilities, and their operating costs and maintenance requirements are minimal. In fact, the main feature of an atmospheric plasma sterilization system is its ability to sterilize heat-sensitive objects in a simple-to-use manner with faster turnaround cycles. Atmospheric plasma sterilization can achieve a direct effect of reactive neutrals, including atomic oxygen and hydroxyl radicals, and plasma generated UV light, all of which can attack and inflict damage to bacteria cell membranes. Thus, applicants recognized the need for devices that can generate an atmospheric pressure plasma as an effective and low-cost sterilization device.

According to one aspect of the present invention, a microwave plasma nozzle for generating plasma from microwaves and a gas is disclosed. The microwave plasma nozzle includes a gas flow tube for having a gas flow therethrough, where the gas flow tube has an outlet portion including a material that is substantially transparent to microwaves. The outlet portion refers to a section including the edge and a portion of the gas flow tube in proximity to the edge. The nozzle also includes a rod-shaped conductor disposed in the gas flow tube. The rod-shaped conductor can include a tip disposed in proximity to the outlet portion of the gas flow tube. It is also possible to include a vortex guide disposed between the rod-shaped conductor and the gas flow tube. The vortex guide has at least one passage that is angled with respect to a longitudinal axis of the rod-shaped conductor for imparting a helical shaped flow direction around the rod-shaped conductor to a gas passing along the passage. It is possible to provide the passage or passages inside the vortex guide and/or the passage(s) can be a channel disposed on an outer surface of the vortex guide so that they are between the vortex guide and the gas flow tube.

According to another aspect of the present invention, a microwave plasma nozzle for generating plasma from microwaves and a gas comprises a gas flow tube for having a gas flow therethrough, a rod-shaped conductor disposed in the gas flow tube and a vortex guide disposed between the rod-shaped conductor and the gas flow tube. The rod-shaped conductor has a tip disposed in proximity to the outlet portion of the gas flow tube. The vortex guide has at least one passage angled with respect to a longitudinal axis of the rod-shaped conductor for imparting a helical shaped flow direction around the rod-shaped conductor to a gas passing along the passage.

According to still another aspect of the present invention, a microwave plasma nozzle for generating plasma from microwaves and a gas comprises a gas flow tube for having a gas flow therethrough, a rod-shaped conductor disposed in the gas flow tube, a grounded shield for reducing microwave power loss through the gas flow tube, and a position holder disposed between the rod-shaped conductor and the grounded shield for securely holding the rod-shaped conductor relative to the grounded shield. The rod-shaped conductor has a tip disposed in proximity to the outlet portion of the gas flow tube. The grounded shield has a hole for receiving a gas flow therethrough and is fitted into the exterior surface of the gas flow tube.

According to yet another aspect of the present invention, an apparatus for generating plasma is provided. The apparatus comprises a microwave cavity having a wall forming a portion of a gas flow passage; a gas flow tube for having a gas flow therethrough, the gas flow tube having an inlet portion connected to the microwave cavity and the gas flow tube has an outlet portion including a dielectric material. The nozzle also includes a rod-shaped conductor disposed in the gas flow tube. The rod-shaped conductor has a tip disposed in proximity to the outlet portion of the gas flow tube. A portion of the rod-shaped conductor is disposed in the microwave cavity and can receive microwaves passing therethrough. The microwave plasma nozzle can also include a means for reducing a microwave power loss through the gas flow tube. The means for reducing a microwave power loss can include a shield that is disposed adjacent to a portion of the gas flow tube. The shield can be supplied to the exterior and/or interior of the gas flow tube. The nozzle can also be provided with a grounded shield disposed adjacent to a portion of the gas flow tube. A shielding mechanism for reducing microwave loss through the gas flow tube can also be provided. The shielding mechanism may be an inner shield tube disposed within the gas flow tube or a grounded shield covering a portion of the gas flow tube.

According to another aspect of the present invention, a plasma generating system comprises a microwave cavity and a nozzle operatively connected to the microwave cavity. The nozzle includes a gas flow tube that has an outlet portion made of a dielectric material, a rod-shaped conductor disposed in the gas flow tube, a grounded shield connected to the microwave cavity and disposed on an exterior surface of the gas flow tube, and a position holder disposed between the rod-shaped conductor and the grounded shield for securely holding the rod-shaped conductor relative to the grounded shield. The rod-shaped conductor has a tip disposed in proximity to the outlet portion of the gas flow tube and a portion disposed in the microwave cavity to collect microwave. The grounded shield reduces microwave power loss through the gas flow tube and has a hole for receiving a gas flow therethrough.

According to another aspect of the present invention, a plasma generating system is disclosed. The plasma generating system comprises a microwave generator for generating microwave; a power supply connected to the microwave generator for providing power thereto; a microwave cavity having a wall forming a portion of a gas flow passage; a waveguide operatively connected to the microwave cavity for transmitting microwaves thereto; an isolator for dissipating microwaves reflected from the microwave cavity; a gas flow tube for having a gas flow therethrough, the gas flow tube having an outlet portion including a dielectric material, the gas flow tube also having an inlet portion connected to the microwave cavity; and a rod-shaped conductor disposed in the gas flow tube. The rod-shaped conductor has a tip disposed in proximity to the outlet portion of the gas flow tube. A portion of the rod-shaped conductor is disposed in the microwave cavity for receiving or collecting microwaves. A vortex guide can also be disposed between the rod-shaped conductor and the gas flow tube. The vortex guide has at least one passage that is angled with respect to a longitudinal axis of the rod-shaped conductor for imparting a helical shaped flow direction around the rod-shaped conductor to a gas passing along the passage.

According to another aspect of the present invention, a plasma generating system is disclosed. The plasma generating system comprises: a microwave generator for generating microwave; a power supply connected to the microwave generator for providing power thereto; a microwave cavity; a waveguide operatively connected to the microwave cavity for transmitting microwaves to the microwave cavity; an isolator for dissipating microwaves reflected from the microwave cavity; a gas flow tube for having a gas flow therethrough, the gas flow tube having an outlet portion including a dielectric material; a rod-shaped conductor disposed in the gas flow tube; a grounded shield connected to the microwave cavity and configured to reduce a microwave power loss through the gas flow tube; and a position holder disposed between the rod-shaped conductor and the grounded shield for securely holding the rod-shaped conductor relative to the grounded shield. The rod-shaped conductor has a tip disposed in proximity to the outlet portion of the gas flow tube. A portion of the rod-shaped conductor is disposed in the microwave cavity for receiving or collecting microwaves. The ground shield has a hole for receiving a gas flow therethrough and is disposed on an exterior surface of the gas flow tube.

According to yet another aspect of the present invention, a method for generating plasma using microwaves is provided. The method comprises the steps of providing a microwave cavity; providing a gas flow tube and a rod-shaped conductor disposed in an axial direction of the gas flow tube; positioning a first portion of the rod-shaped conductor adjacent an outlet portion of the gas flow tube and disposing a second portion of the rod-shaped conductor in the microwave cavity; providing a gas to the gas flow tube; transmitting microwaves to the microwave cavity; receiving the transmitted microwaves using at least the second portion of the rod-shaped conductor; and generating plasma using the gas provided in the step of providing a gas to the gas flow tube and by using the microwaves received in the step of receiving.

These and other advantages and features of the invention will become apparent to those persons skilled in the art upon reading the details of the invention as more fully described below.

DETAILED DESCRIPTION OF THE PREFERRED EMBODIMENTS

Figure 1:
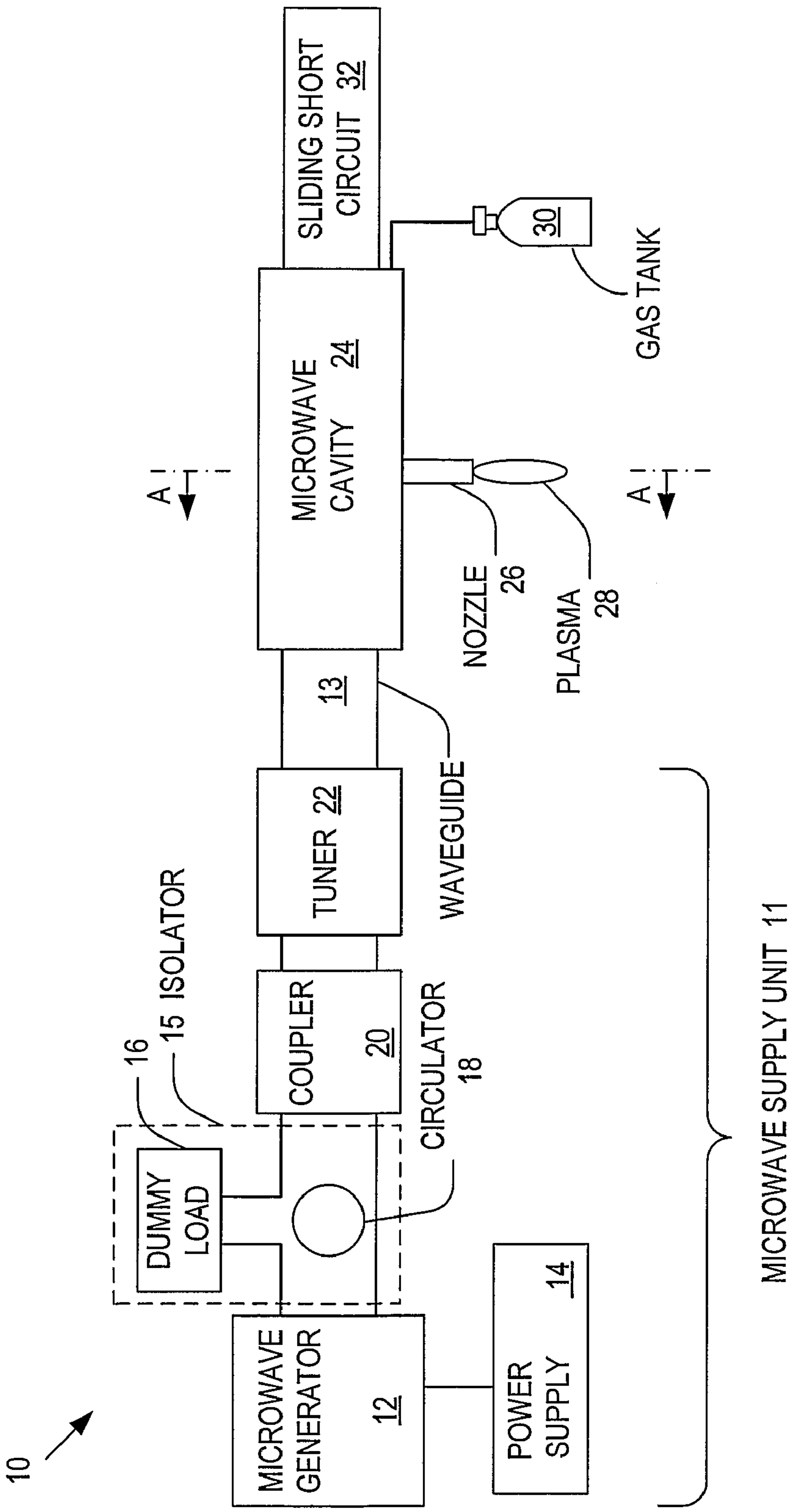
FIG. 1 is a schematic diagram of a plasma generating system having a microwave cavity and a nozzle in accordance with a first embodiment of the present invention.

FIG. 1 is a schematic diagram of a system for generating microwave plasma and having a microwave cavity and a nozzle in accordance with one embodiment of the present invention. As illustrated, the system shown at 10 may include: a microwave cavity 24; a microwave supply unit 11 for providing microwaves to the microwave cavity 24; a waveguide 13 for transmitting microwaves from the microwave supply unit 11 to the microwave cavity 24; and a nozzle 26 connected to the microwave cavity 24 for receiving microwaves from the microwave cavity 24 and generating an atmospheric plasma 28 using a gas and/or gas mixture received from a gas tank 30. A commercially available sliding short circuit 32 can be attached to the microwave cavity 24 to control the microwave energy distribution within the microwave cavity 24 by adjusting the microwave phase.

The microwave supply unit 11 provides microwaves to the microwave cavity 24 and may include: a microwave generator 12 for generating microwaves; a power supply for supplying power to the microwave generator 14; and an isolator 15 having a dummy load 16 for dissipating reflected microwaves that propagates toward the microwave generator 12 and a circulator 18 for directing the reflected microwaves to the dummy load 16.

In an alternative embodiment, the microwave supply unit 11 may further include a coupler 20 for measuring fluxes of the microwaves; and a tuner 22 for reducing the microwaves reflected from the microwave cavity 24. The components of the microwave supply unit 11 shown in FIG. 1 are well known and are listed herein for exemplary purposes only. Also, it is possible to replace the microwave supply unit 11 with a system having the capability to provide microwaves to the microwave cavity 24 without deviating from the present invention. Likewise, the sliding short circuit 32 may be replaced by a phase shifter that can be configured in the microwave supply unit 11. Typically, a phase shifter is mounted between the isolator 15 and the coupler 20.

Figure 2:
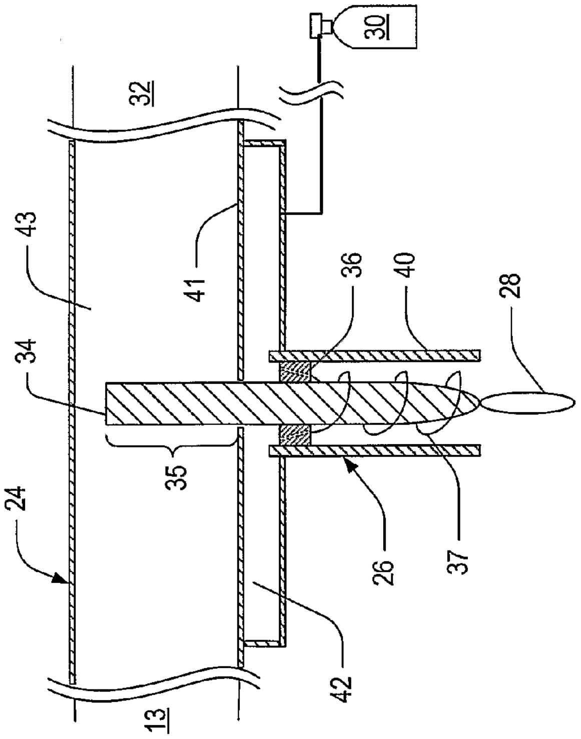
FIG. 2 is a partial cross-sectional view of the microwave cavity and nozzle taken along the line A-A shown in FIG. 1.

FIG. 2 is a partial cross-sectional view of the microwave cavity 24 and the nozzle 26 taken along the line A-A in FIG. 1. As illustrated, the microwave cavity 24 includes a wall 41 that forms a gas channel 42 for admitting gas from the gas tank 30; and a cavity 43 for containing the microwaves transmitted from the microwave generator 12. The nozzle 26 includes a gas flow tube 40 sealed with the cavity wall or the structure forming the gas channel 42 for receiving gas therefrom; a rod-shaped conductor 34 having a portion 35 disposed in the microwave cavity 24 for receiving microwaves from within the microwave cavity 24; and a vortex guide 36 disposed between the rod-shaped conductor 34 and the gas flow tube 40. The vortex guide 36 can be designed to securely hold the respective elements in place.

At least some parts of an outlet portion of the gas flow tube 40 can be made from conducting materials. The conducting materials used as part of the outer portion of the gas flow tube will act as a shield and it will improve plasma efficiencies.

The part of the outlet portion using the conducting material can be disposed, for example, at the outlet edge of the gas flow tube.

Figure 3:
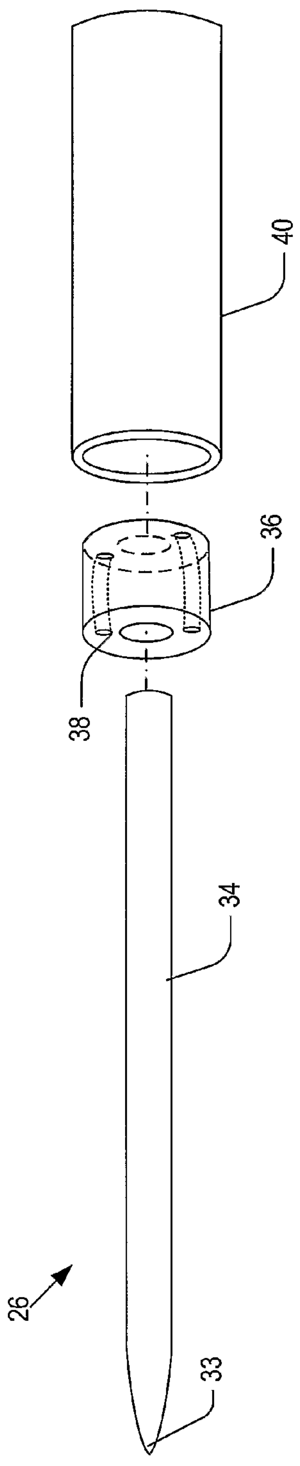
FIG. 3 is an exploded view of the gas flow tube, rod-shaped conductor and vortex guide included in the nozzle depicted in FIG. 2.

FIG. 3 is an exploded perspective view of the nozzle 26 shown in FIG. 2. As shown in FIG. 3, a rod-shaped conductor 34 and a gas flow tube 40 can engage the inner and outer perimeters of the vortex guide 36, respectively. The rod-shaped conductor 34 acts as an antenna to collect microwaves from the microwave cavity 24 and focuses the collected microwaves to a tapered tip 33 to generate plasma 28 using the gas flowing through the gas flow tube 40. The rod-shaped conductor 34 may be made of any material that can conduct microwaves. The rod-shaped conductor 34 can be made out of copper, aluminum, platinum, gold, silver and other conducting materials. The term rod-shaped conductor is intended to cover conductors having various cross sections such as a circular, oval, elliptical, or an oblong cross section or combinations thereof. It is preferred that the rod-shaped conductor not have a cross section such that two portions thereof meet to form an angle (or sharp point) as the microwaves will concentrate in this area and decrease the efficiency of the device.

The gas flow tube 40 provides mechanical support for the overall nozzle 26 and may be made of any material that microwaves can pass through with very low loss of energy (substantially transparent to microwaves). The material may be preferably quartz or other conventional dielectric material, but it is not limited thereto.

The vortex guide 36 has at least one passage or channel 38. The passage 38 (or passages) imparts a helical shaped flow direction around the rod-shaped conductor 34 to the gas flowing through the tube as shown in FIG. 2. A gas vortex flow path 37 allows for an increased length and stability of the plasma 28. It also allows for the conductor to be a shorter length than would otherwise be required for producing plasma. Preferably, the vortex guide 36 may be made of a ceramic material. The vortex guide 36 can be made out of any other non-conducting material that can withstand exposure to high temperatures. For example, a high temperature plastic that is also a microwave transparent material is used for the vortex guide 36.

In FIG. 3, each through-pass hole or passage 38 is schematically illustrated as being angled to the longitudinal axis of the rod-shaped conductor and can be shaped so that a helical or spiral flow would be imparted to the gas flowing through the passage or passages. However, the passage or passages may have other geometric flow path shapes as long as the flow path causes a swirling flow around the rod-shaped conductor.

Figures 4A, 4B, 4C:
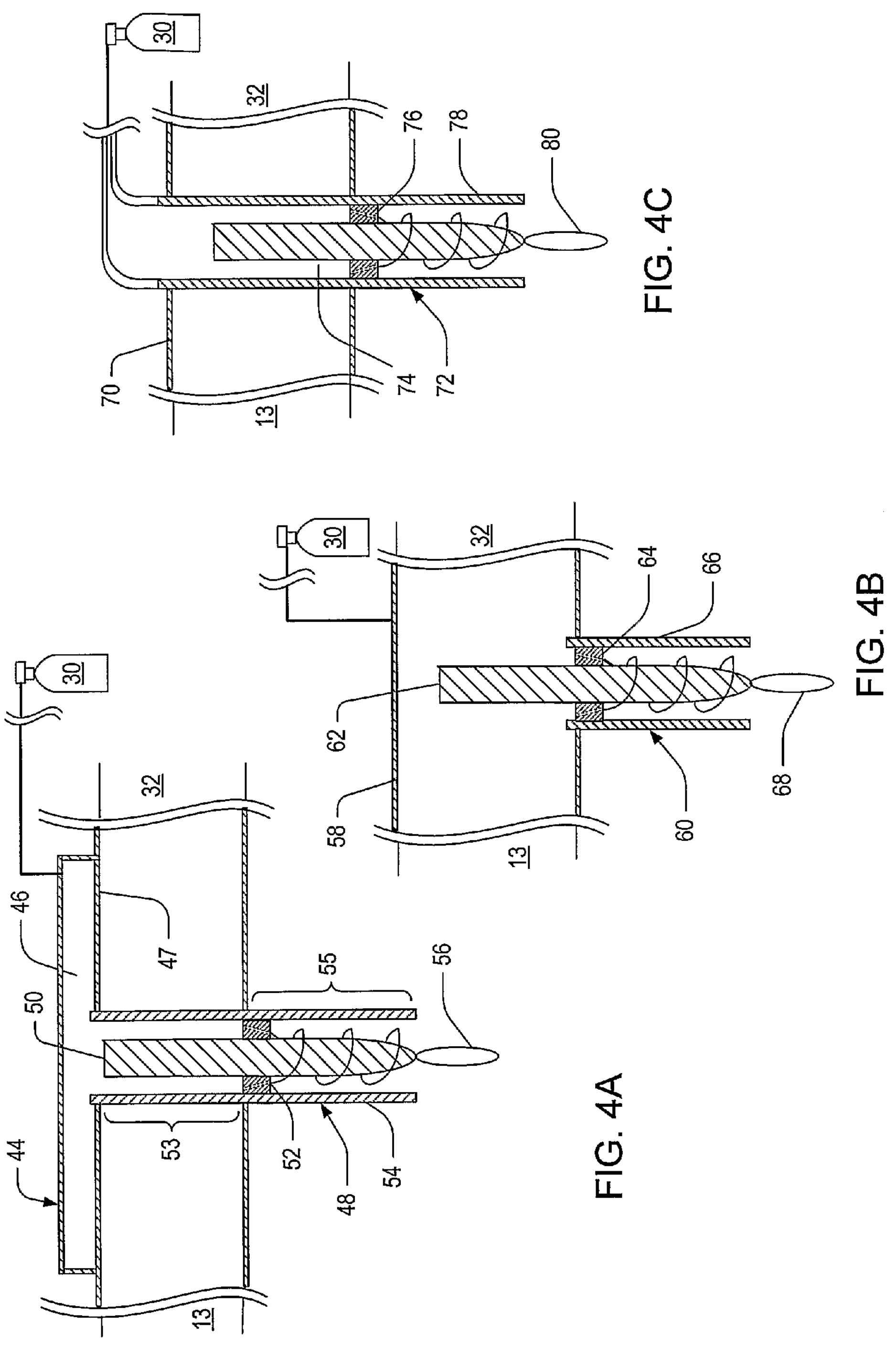
FIGS. 4A-4C are partial cross-sectional views of alternative embodiments of the microwave cavity and nozzle taken along the line A-A shown in FIG. 1.

Referring back to FIG. 2, the microwave cavity wall 41 forms a gas channel for admitting gas from the gas tank 30. The inlet portion of the gas flow tube 40 is connected to a portion of the wall 41. FIGS. 4A-4C illustrate various embodiments of the gas feeding system shown in FIG. 2, which have components that are similar to their counterparts in FIG. 2.

FIG. 4A is a partial cross-sectional view of an alternative embodiment of the microwave cavity and nozzle arrangement shown in FIG. 2. In this embodiment, a microwave cavity 44 has a wall 47 forming a gas flow channel 46 connected to gas tank 30. The nozzle 48 includes a rod-shaped conductor 50, a gas flow tube 54 connected to microwave cavity wall 46, and a vortex guide 52. In this embodiment, the gas flow tube 54 may be made of any material that allows microwaves to pass through with a very low loss of energy. As a consequence, the gas flowing through the gas flow tube 54 may be pre-heated within the microwave cavity 44 prior to reaching the tapered tip of the rod-shaped conductor 50. In a first alternative embodiment, an upper portion 53 of the gas flow tube 54 may be made of a material substantially transparent to microwaves such as a dielectric material, while the other portion 55 may be made of conducting material with the outlet portion having a material substantially transparent to microwaves.

In a second alternative embodiment, the portion 53 of the gas flow tube 54 may be made of a dielectric material, and the portion 55 may include two sub-portions: a sub-portion made of a dielectric material near the outlet portion of the gas flow tube 54 and a sub-portion made of a conducting material. In a third alternative embodiment, the portion 53 of the gas flow tube 54 may be made of a dielectric material, and the portion 55 may include two sub-portions: a sub-portion made of a conducting material near the outlet portion of the gas flow tube 54 and a sub-portion made of a dielectric material. As in the case of FIG. 2, the microwaves received by a portion of the rod-shaped conductor 50 are focused on the tapered tip to heat the gas into plasma 56.

FIG. 4B is a partial cross-sectional view of another embodiment of the microwave cavity and nozzle shown in FIG. 2. In FIG. 4B, the entire microwave cavity 58 forms a gas flow channel connected to the gas tank 30. The nozzle 60 includes a rod-shaped conductor 62, a gas flow tube 66 connected to a microwave cavity 58, and a vortex guide 64. As in the case of FIG. 2, the microwaves collected by a portion of the rod-shaped conductor 62 are focused on the tapered tip to heat the gas into plasma 68.

FIG. 4C is a partial cross-sectional view of yet another embodiment of the microwave cavity and nozzle shown in FIG. 2. In FIG. 4C, a nozzle 72 includes a rod-shaped conductor 74, a gas flow tube 78 connected to gas tank 30, and a vortex guide 76. In this embodiment, unlike the systems of FIGS. 4A-4B, a microwave cavity 70 is not directly connected to gas tank 30. The gas flow tube 78 may be made of a material that is substantially transparent to microwave so that the gas may be pre-heated within the microwave cavity 70 prior to reaching the tapered tip of rod-shaped conductor 74. As in the case of FIG. 2, the microwaves collected by a portion of the rod-shaped conductor 74 are focused on the tapered tip to heat the gas into plasma 80. In this embodiment, the gas flow from tank 30 passes through the gas flow tube 78 which extends through the microwave cavity. The gas then flows through the vortex guide 76 and it is heated into plasma 80 near the tapered tip.

As illustrated in FIG. 2, a portion 35 of the rod-shaped conductor 34 is inserted into the cavity 43 to receive and collect the microwaves. Then, these microwaves travel along the surface of the conductor 34 and are focused at the tapered tip. Since a portion of the traveling microwaves may be lost through the gas flow tube 40, a shielding mechanism may be used to enhance the efficiency and safety of the nozzle, as shown in FIGS. 5A-5B.

Figures 5A, 5B, 5C, 5D, 5E, 5F:
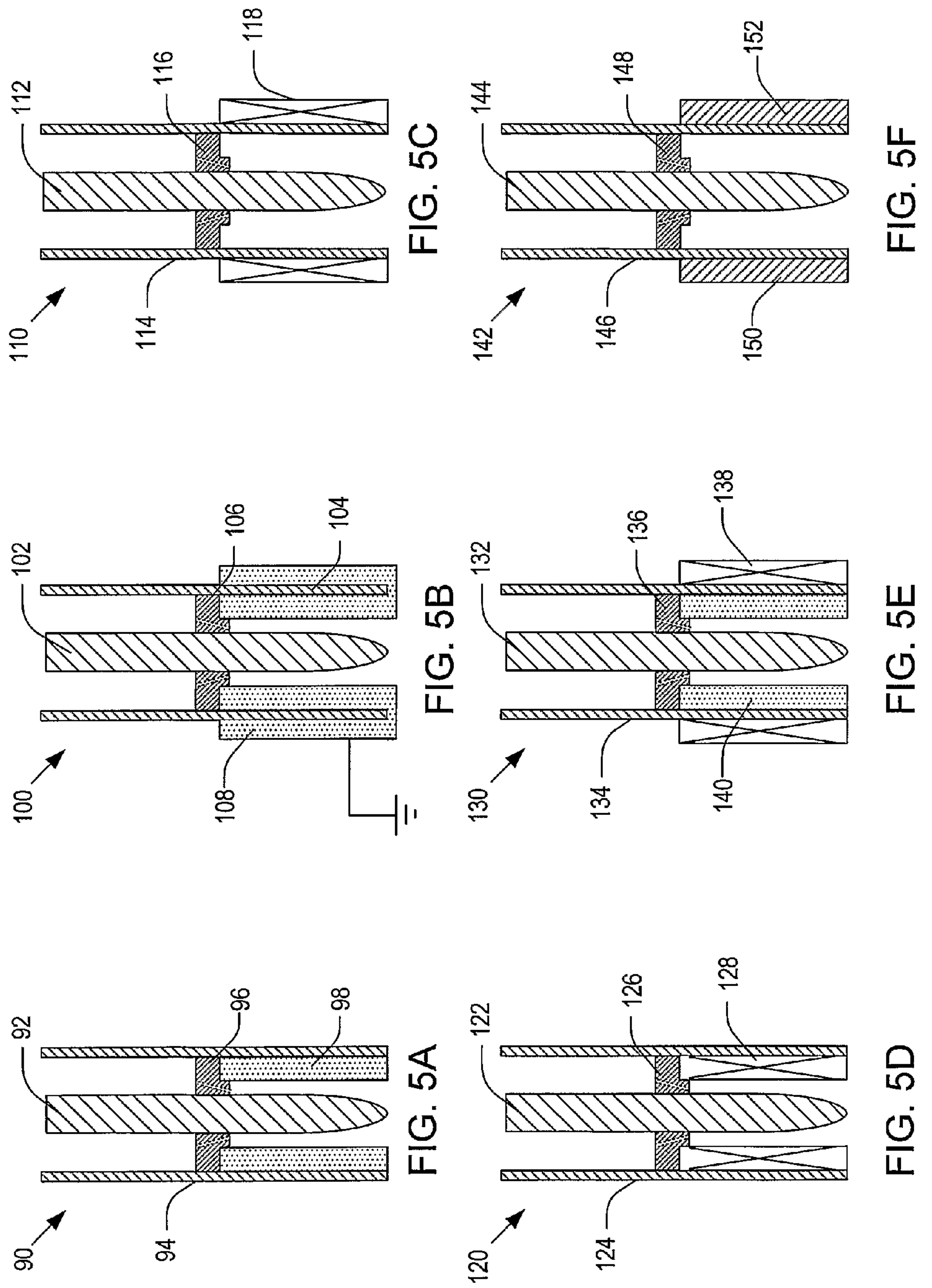
FIGS. 5A-5F are cross-sectional views of alternative embodiments of the gas flow tube, rod-shaped conductor and vortex guide shown in FIG. 2, which include additional components that enhance nozzle efficiency.

FIG. 5A is a cross-sectional view of an alternative embodiment of the nozzle shown in FIG. 2. As illustrated, a nozzle 90 includes a rod-shaped conductor 92, a gas flow tube 94, a vortex guide 96, and an inner shield 98 for reducing a microwave power loss through gas flow tube 94. The inner shield 98 may have a tubular shape and can be disposed in a recess formed along the outer perimeter of the vortex guide 96. The inner shield 98 provides additional control of the helical flow direction around the rod-shaped conductor 92 and increases the stability of the plasma by changing the gap between the gas flow tube 94 and the rod-shaped conductor 92.

FIG. 5B is a cross-sectional view of another embodiment of the nozzle shown in FIG. 2. As illustrated, a nozzle 100 includes a rod-shaped conductor 102, a gas flow tube 104, a vortex guide 106 and a grounded shield 108 for reducing a microwave power loss through the gas flow tube 104. A grounded shield 108 can cover a portion of gas flow tube 104 and made of metal, such as copper. Like the inner shield 98, the grounded shield 108 can provide additional control of helical flow direction around the rod-shaped conductor 102 and can increase the plasma stability by changing the gap between gas flow tube 104 and rod-shaped conductor 102.

The main heating mechanism applied to the nozzles shown in FIGS. 2 and 4A-4C is the microwaves that are focused and discharged at the tip of the rod-shaped conductor, where the nozzles can produce non-LTE plasmas for sterilization. The temperature of the ions and the neutral species in non-LTE plasmas can be less than 100° C., while the temperature of electrons can be up to several tens of thousand degrees in Celsius. To enhance the electron temperature and increase the nozzle efficiency, the nozzles can include additional mechanisms that electronically excite the gas while the gas is within the gas flow tube, as illustrated in FIGS. 5C-5F.

FIG. 5C is a cross-sectional view of yet another embodiment of the nozzle shown in FIG. 2. As illustrated, a nozzle 110 includes a rod-shaped conductor 112, a gas flow tube 114, a vortex guide 116, and a pair of outer magnets 118 for electronic excitation of the gas flowing in gas flow tube 114. Each of the pair of outer magnets 118 may be shaped as a portion of a cylinder having, for example, a semicircular cross section disposed around the outer surface of the gas flow tube 114.

FIG. 5D is a cross-sectional view of still another embodiment of the nozzle shown in FIG. 2. As depicted, a nozzle 120 includes a rod-shaped conductor 122, a gas flow tube 124, a vortex guide 126, and a pair of inner magnets 128 that are secured by the vortex guide 126 within the gas flow tube 124 for electronic excitation of the gas flowing in gas flow tube 124. Each of the pair of inner magnets 128 may be shaped as a portion of a cylinder having, for example, a semicircular cross section.

FIG. 5E is a cross-sectional view of still another embodiment of the nozzle shown in FIG. 2. As illustrated, a nozzle 130 includes a rod-shaped conductor 132, a gas flow tube 134, a vortex guide 136, a pair of outer magnets 138, and an inner shield 140. Each of the outer magnets 118 may be shaped as a portion of a cylinder having, for example, a semicircular cross section. In an alternative embodiment, the inner shield 140 may have a generally tubular shape.

FIG. 5F is a cross-sectional view of another embodiment of the nozzle shown in FIG. 2. As illustrated, a nozzle 142 includes a rod-shaped conductor 144, a gas flow tube 146, a vortex guide 148, an anode 150, and a cathode 152. The anode 150 and the cathode 152 are connected to an electrical power source (not shown for simplicity). This arrangement allows the anode 150 and the cathode 152 to electronically excite the gas flowing in gas flow tube 146. The anode and the cathode generate an electromagnetic field which charges the gas as it passes through the magnetic field. This allows that plasma to have a higher energy potential and this improves the mean life span of the plasma.

FIGS. 5A-5F are cross-sectional views of various embodiments of the nozzle shown in FIG. 2. It should be understood that the various alternative embodiments shown in FIGS. 5A-5F can also be used in place of the nozzles shown in FIGS. 4A-4C.

Figures 6A, 6B, 6C, 6D, 6E, 6F:
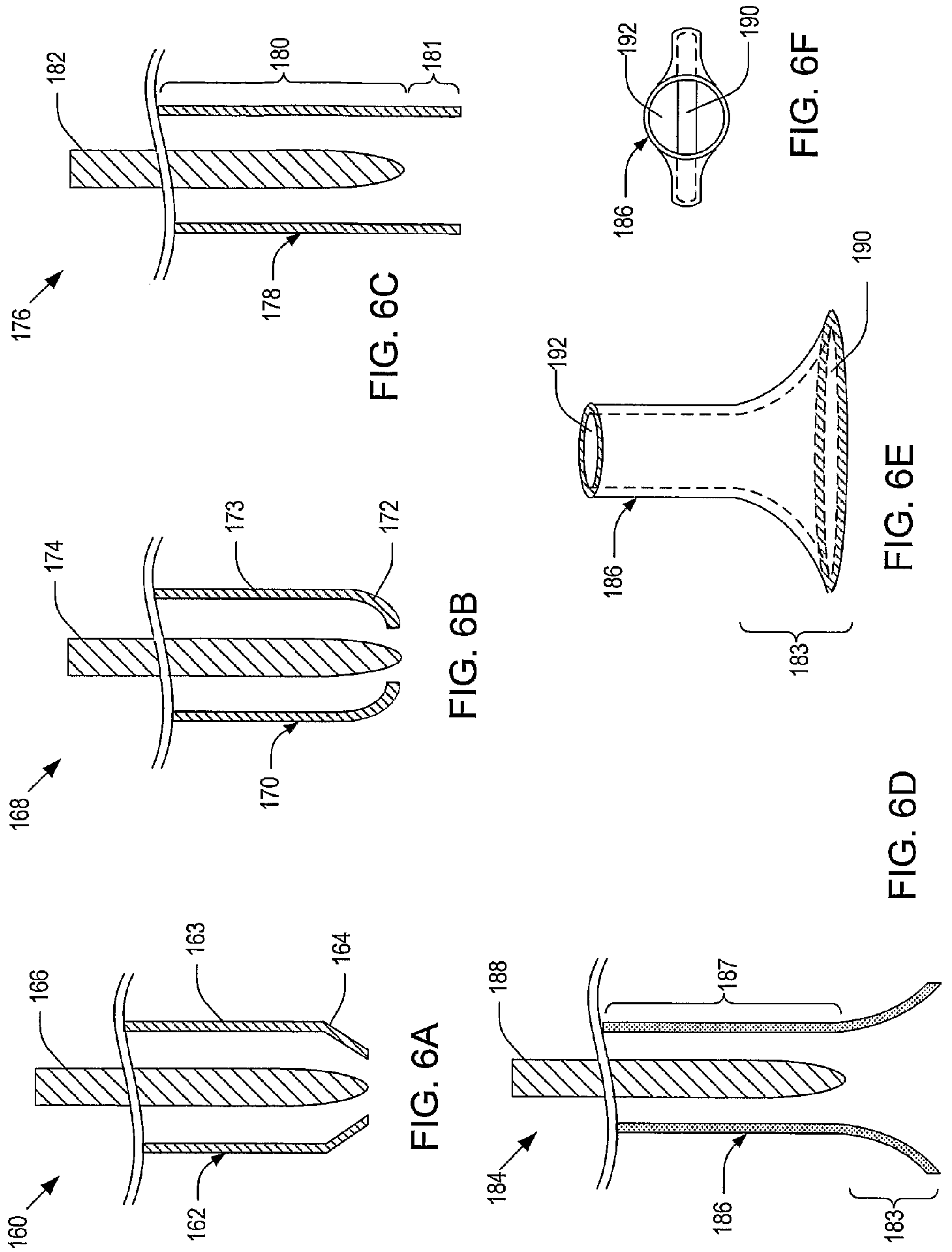
FIGS. 6A-6D show cross-sectional views of alternative embodiments of the gas flow tube depicted in FIG. 2, which include four different geometric shapes of the outlet portion of the gas flow tube.
FIGS. 6E and 6F are a perspective and a top plan view of the gas flow tube illustrated in FIG. 6D, respectively.

Referring back to FIGS. 2-3, the gas flow tube 40 is described as a straight tube. However, the cross-section of gas flow tube 40 may change along its length to direct the helical flow direction 37 toward the tip 33, as shown in FIGS. 6A-6B. For example, FIG. 6A is a partial cross-sectional view of an alternative embodiment of the nozzle 26 (FIG. 2). As illustrated, a nozzle 160 may have a rod-shaped conductor 166 and a gas flow tube 162 including a straight section 163 and a frusto-conical section 164. FIG. 6B is a cross-sectional view of another alternative embodiment of the nozzle 26, where the gas flow tube 170 has a straight section 173 and a curved section, such as for example, a bell-shaped section 172.

FIG. 6C is a cross-sectional view of still another alternative embodiment of the nozzle 26 (FIG. 2). As depicted, a nozzle 176 may have a rod-shaped conductor 182 and a gas flow tube 178, where the gas flow tube 178 has a straight portion 180 and an extended guiding portion 181 for elongating the plasma plume length and enhancing the plume stability. FIG. 6D is a cross-sectional view of yet another alternative embodiment of the nozzle 26. As depicted, a nozzle 184 may have a rod-shaped conductor 188 and a gas flow tube 186, where the gas flow tube 186 has a straight portion 187 and a plume modifying portion 183 for modifying the plasma plume geometry.

FIGS. 6E and 6F are a perspective and a top plan view of the gas flow tube 186 illustrated in FIG. 6D, respectively. The inlet 192 of the gas flow tube 186 may have a generally circular shape, while the outlet 190 may have a generally slender slit shape. The plume modifying portion 183 may change the cross sectional geometry of the plasma plume from a generally circle at the tapered tip to a generally narrow strip at the outlet 190.

Figure 6G:
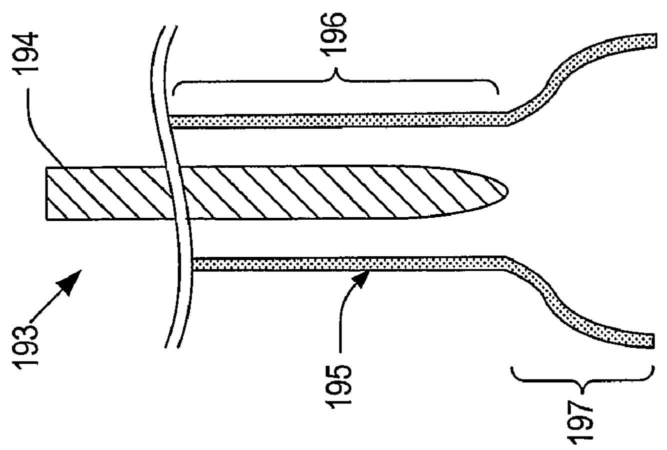
FIG. 6G shows a cross-sectional view of another alternative embodiment of the gas flow tube depicted in FIG. 2.

FIG. 6G is a cross-sectional view of a further alternative embodiment of the nozzle 26. As depicted, a nozzle 193 may have a rod-shaped conductor 194 and a gas flow tube 195, where the gas flow tube 195 has a straight portion 196 and a plume expanding portion 197 for expanding the plasma plume diameter.

Figure 6H:
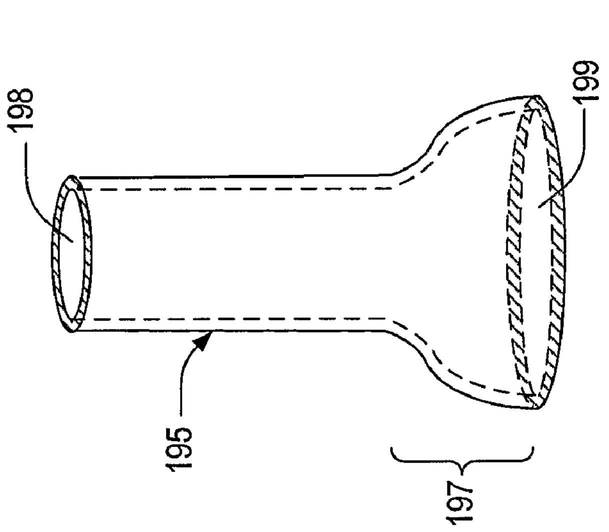
FIGS. 6H and 6I are a perspective and a top plan view of the gas flow tube illustrated in FIG. 6G, respectively.
Figure 6I:
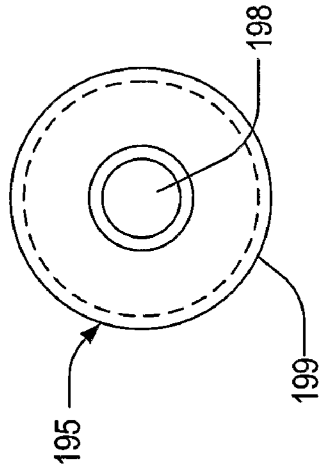

FIGS. 6H and 6I are a perspective and a top plan view of the gas flow tube 195 illustrated in FIG. 6G, respectively. The plume expanding portion 197 may have a generally bell shape, wherein the outlet 199 of the plume expanding portion 197 has a larger diameter than the inlet 198. As the plasma travels from the tip of the rod-shaped conductor to the outlet 199, the plasma plume diameter may increase.

Figure 7A:
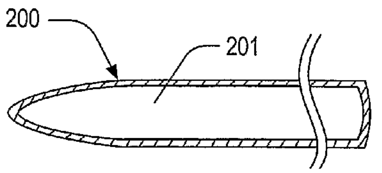
FIGS. 7A-7I are alternative embodiments of the rod-shaped conductor shown in FIG. 2.

As illustrated in FIG. 2, the microwaves are received by a collection portion 35 of the rod-shaped conductor 34 extending into the microwave cavity 24. These microwaves travel down the rod-shaped conductor toward the tapered tip 33. More specifically, the microwaves are received by and travel along the surface of the rod-shaped conductor 34. The depth of the skin responsible for microwave penetration and migration is a function of the microwave frequency and the conductor material. The microwave penetration distance can be less than a millimeter. Thus, a rod-shaped conductor 200 of FIG. 7A having a hollow portion 201 is an alternative embodiment for the rod-shaped conductor.

Figure 7B:
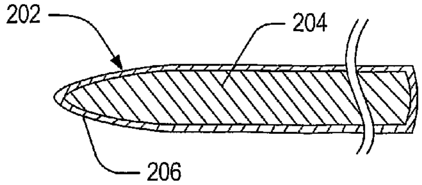

It is well known that some precious metals are good microwave conductors. Thus, to reduce the unit price of the device without compromising the performance of the rod-shaped conductor, the skin layer of the rod-shaped conductor can be made of precious metals that are good microwave conductors while cheaper conducting materials can be used for inside of the core. FIG. 7B is a cross-sectional view of another alternative embodiment of a rod-shaped conductor, wherein a rod-shaped conductor 202 includes skin layer 206 made of a precious metal and a core layer 204 made of a cheaper conducting material.

Figure 7C:
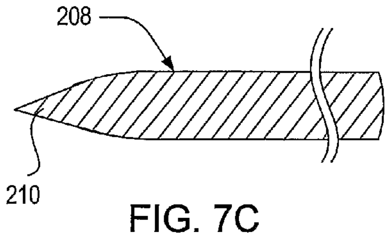

FIG. 7C is a cross-sectional view of yet another alternative embodiment of the rod-shaped conductor, wherein a rod-shaped conductor 208 includes a conically-tapered tip 210. Other cross-sectional variations can also be used. For example, conically-tapered tip 210 may be eroded by plasma faster than other portion of the rod-conductor 208 and thus may need to be replaced on a regular basis.

Figure 7D:
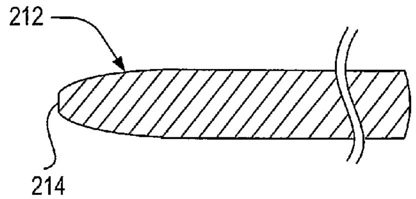

FIG. 7D is a cross-sectional view of another alternative embodiment of the rod-shaped conductor, wherein a rod-shaped conductor 212 has a blunt-tip 214 instead of a pointed tip to increase the lifetime thereof.

Figure 7E:
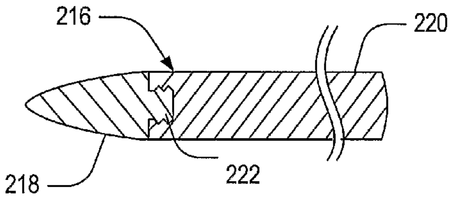
Figure 7F:
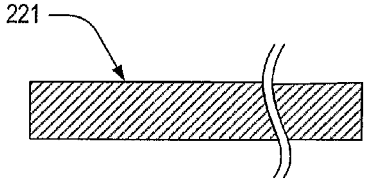
Figure 7G:
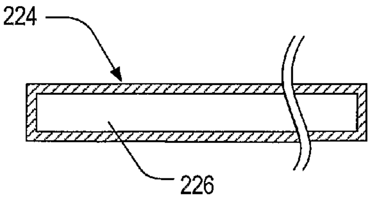
Figure 7H:
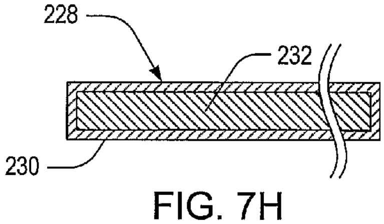
Figure 7I:
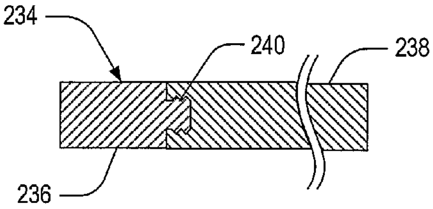

FIG. 7E is a cross-sectional view of another alternative embodiment of the rod-shaped conductor, wherein a rod-shaped conductor 216 has a tapered section 218 secured to a cylindrical portion 220 by a suitable fastening mechanism 222 (in this case, the tapered section 218 can be screwed into the cylindrical portion 220 using the screw end 222) for easy and quick replacement thereof.

FIGS. 7F-7I show cross-sectional views of further alternative embodiments of the rod-shaped conductor. As illustrated, rod-shaped conductors 221, 224, 228 and 234 are similar to their counterparts 34 (FIG. 2), 200 (FIG. 7A), 202 (FIG. 7B) and 216 (FIG. 7E), respectively, with the difference that they have blunt tips for reducing the erosion rate due to plasma.)

Figure 8:
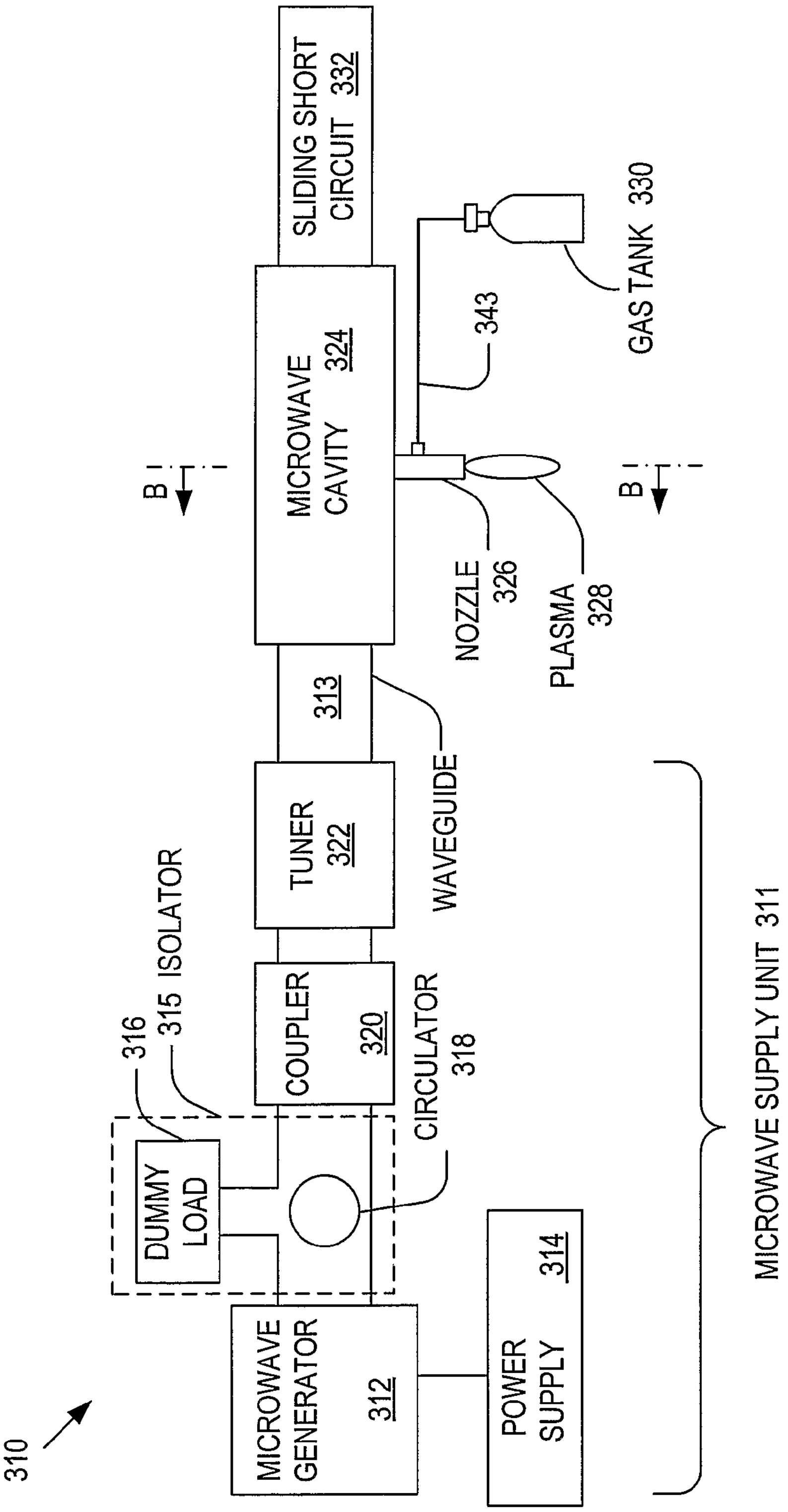
FIG. 8 is a schematic diagram of a plasma generating system having a microwave cavity and a nozzle in accordance with a second embodiment of the present invention.

FIG. 8 is a schematic diagram of a system for generating microwave plasma and having a microwave cavity and a nozzle in accordance with another embodiment of the present invention. As illustrated, the system may include: a microwave cavity 324; a microwave supply unit 311 for providing microwaves to the microwave cavity 324; a waveguide 313 for transmitting microwaves from the microwave supply unit 311 to the microwave cavity 324; and a nozzle 326 connected to the microwave cavity 324 for receiving microwaves from the microwave cavity 324 and generating an atmospheric plasma 328 using a gas and/or gas mixture received from a gas tank 330. The system 310 may be similar to the system 10 (FIG. 1) with the difference that the nozzle 326 may receive the gas directly from the gas tank 330 through a gas line or tube 343.

Figure 9:
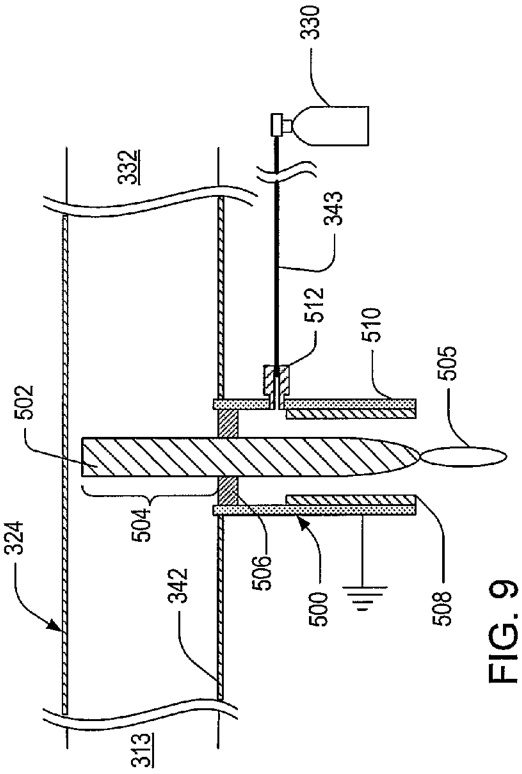
FIG. 9 is a partial cross-sectional view of the microwave cavity and nozzle taken along the line B-B shown in FIG. 8.

FIG. 9 illustrates a partial cross-sectional view of the microwave cavity 324 and nozzle 326 taken along the line B-B shown in FIG. 8. As illustrated, a nozzle 500 may includes: a gas flow tube 508; a grounded shield 510 for reducing microwave loss through gas flow tube 508 and sealed with the cavity wall 342, the gas flow tube 508 being tightly fitted into the grounded shield 510; a rod-shaped conductor 502 having a portion 504 disposed in the microwave cavity 324 for receiving microwaves from within the microwave cavity 324; a position holder 506 disposed between the rod-shaped conductor 502 and the grounded shield 510 and configured to securely hold the rod-shaped conductor 502 relative to the ground shield 510; and a gas feeding mechanism 512 for coupling the gas line or tube 343 to the grounded shield 510. The position holder 506, grounded shield 510, rod-shaped conductor 502 and gas flow tube 508 may be made of the same materials as those of the vortex guide 36 (FIG. 2), grounded shield 108 (FIG. 5B), rod-shaped conductor 34 (FIG. 3) and the gas flow tube 40 (FIG. 3), respectively. For example, the grounded shield 510 may be made of metal and preferably copper. The gas flow tube 508 may be made of a conventional dielectric material and preferably quartz.

Figure 10:
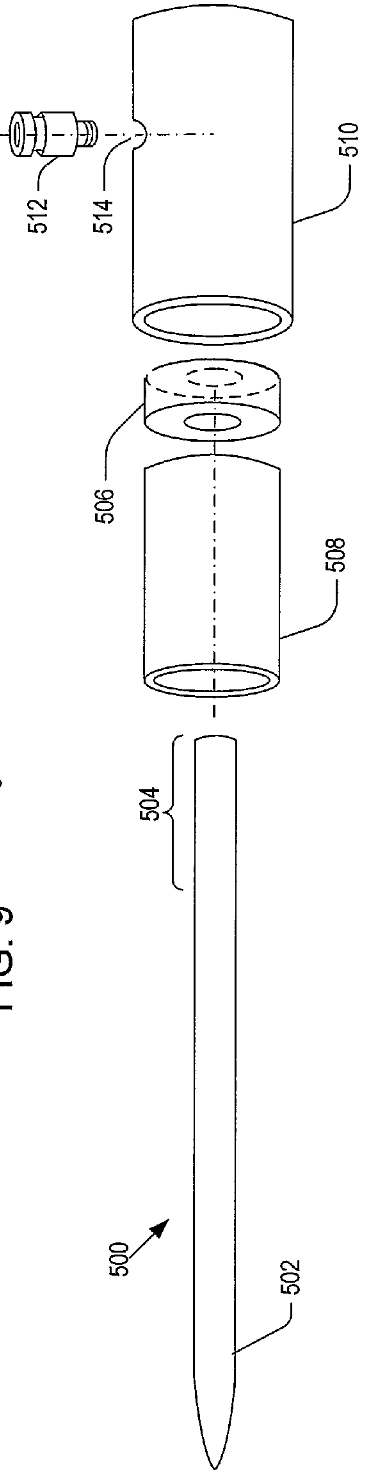
FIG. 10 is an exploded perspective view of the nozzle depicted in FIG. 9.

As illustrated in FIG. 9, the nozzle 500 may receive gas through the gas feeding mechanism 512. The gas feeding mechanism 512 may couple the gas line 343 to the ground shield 510 and be, for example, a pneumatic one-touch fitting (model No. KQ2H05-32) made by SMC Corporation of America, Indianapolis, Ind. One end of the gas feeding mechanism 512 may have a threaded bolt that mates with the female threads formed on the edge of a perforation or hole 514 in the grounded shield 510 (as illustrated in FIG. 10). It is noted that the present invention may be practiced with other suitable device that may couple a gas line 343 to the ground shield 510.

FIG. 10 is an exploded perspective view of the nozzle depicted in FIG. 9. As illustrated, the rod-shaped conductor 502 and the grounded shield 510 can engage the inner and outer perimeters of the position holder 506, respectively. The rod-shaped conductor 502 may have a portion 504 that acts as an antenna to collect microwaves from the microwave cavity 324. The collected microwave may travel along the rod-shaped conductor 502 and generate plasma 505 using the gas flowing through the gas flow tube 508. As in the case of the rod-shaped conductor 34 (FIG. 3), the term rod-shaped conductor is intended to cover conductors having various cross sections such as a circular, oval, elliptical, or an oblong cross section or combinations thereof.

It is noted that the rod-shaped conductor 502 may be one of the various embodiments illustrated in FIGS. 7A-7I. For example, FIG. 11A illustrates an alternative embodiment of the nozzle 520 and having a rod-shaped conductor 524 that is same as the rod-shaped conductor 221 depicted in FIG. 7F.

Figures 11A, 11B, 11C, 11D, 11E:
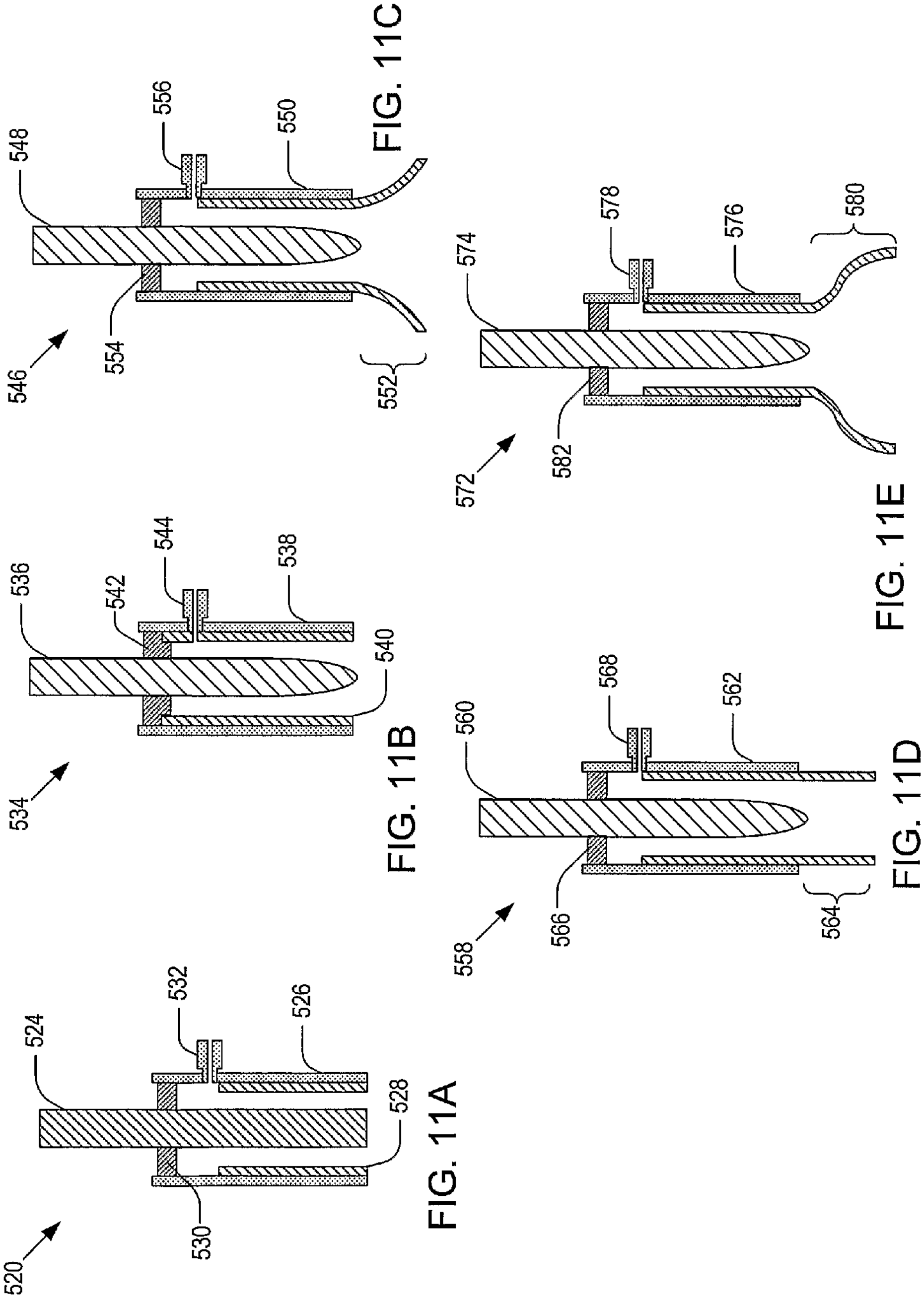
FIGS. 11A-11E are cross-sectional views of alternative embodiments of the nozzle shown in FIG. 9, which include various configurations of the gas flow tube and the rod-shaped conductor in the nozzle.

FIG. 11B is a cross-sectional view of an alternative embodiment of the nozzle shown in FIG. 9. As illustrated, a nozzle 534 may include a rod-shaped conductor 536, a grounded shield 538, a gas flow tube 540 having an outer surface tightly fitted into the inner surface of the ground shield 538, a position holder 542 and a gas feeding mechanism 544. The gas flow tube 540 may have a hole in its wall to form a gas passage and be secured into a recess formed along the outer perimeter of the position holder 542.

The gas flow tube of 508 (FIG. 10) may have alternative embodiments that are similar to those illustrated in FIGS. 6A-6I. For example, FIGS. 11C-11E are cross-sectional views of alternative embodiments of the nozzle 500 having a plume modifying portion 552, an extended guiding portion 564 and a plume expanding portion 580, respectively.

Figure 12:
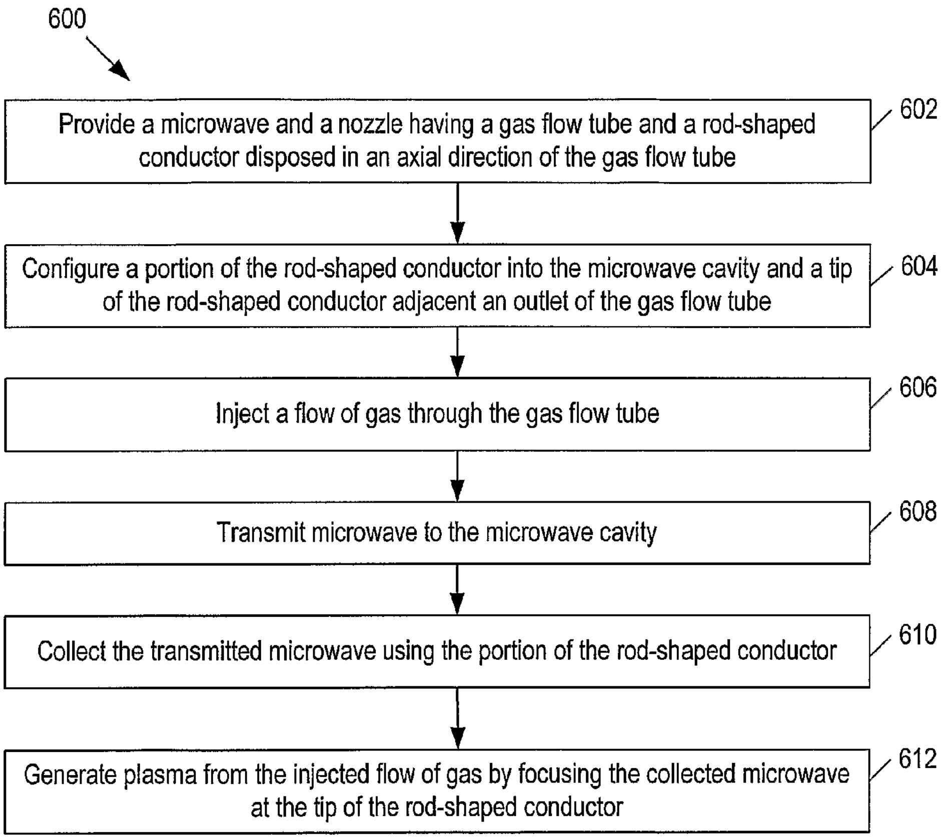
FIG. 12 shows a flow chart illustrating exemplary steps for generating microwave plasma using the systems shown in FIGS. 1 and 8 according to the present invention.

FIG. 12 is a flowchart shown at 600 illustrating exemplary steps that may be taken as an approach to generate microwave plasma using the systems depicted in FIGS. 1 and 8. In step 602, a microwave cavity and a nozzle having a gas flow tube and a rod-shaped conductor are provided, where the rod-shaped conductor is disposed in an axial direction of the gas flow tube. Next, in step 604, a portion of the rod-shaped conductor is configured into the microwave cavity. Also, the tip of the rod-shaped conductor is located adjacent the outlet of the gas flow. Then, in step 606, a gas is injected into the gas flow tube and, in step 608, microwaves are transmitted to the microwave cavity. Next, the transmitted microwaves are received by the configured portion of the rod-shaped conductor in step 610. Consequently, the collected microwave is focused at the tip of the rod-shaped conductor to heat the gas into plasma in step 612.

While the present invention has been described with reference to the specific embodiments thereof, it should be understood that the foregoing relates to preferred embodiments of the invention and that modifications may be made without departing from the spirit and scope of the invention as set forth in the following claims.

We claim:

1. A microwave plasma nozzle for generating plasma from microwaves provided via a microwave cavity and a gas, comprising:

a gas flow tube for having a gas flow therethrough, said gas flow tube having an outlet portion whereat gas of said gas flow is discharged, and said outlet portion including a material that is substantially transparent to microwaves; and a rod-shaped conductor disposed in said gas flow tube, said rod-shaped conductor having opposite ends, said opposite ends being a first end and a second end, said rod-shaped conductor being configured for disposition of the second end in the microwave cavity, and said rod-shaped conductor being configured so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion.

2. A microwave plasma nozzle as defined in claim 1, further comprising:

a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to the gas of said gas flow passing along said at least one passage.

3. A microwave plasma nozzle as defined in claim 1, wherein said rod-shaped conductor has a circular cross-section.

4. A microwave plasma nozzle as defined in claim 1, wherein said gas flow tube consists of a material that is substantially transparent to microwave.

5. A microwave plasma nozzle as defined in claim 4, wherein the material is a dielectric material.

6. A microwave plasma nozzle as defined in claim 4, wherein the material is quartz.

7. A microwave plasma nozzle as defined in claim 1, further comprising:

a shield disposed within a portion of said gas flow tube for reducing a microwave power loss through said gas flow tube.

8. A microwave plasma nozzle as defined in claim 7, wherein said shield includes a conducting material.

9. A microwave plasma nozzle as defined in claim 1, further comprising:

a grounded shield disposed adjacent to a portion of said gas flow tube for reducing a microwave power loss through said gas flow tube.

10. A microwave plasma nozzle as defined in claim 1, further comprising:

a grounded shield disposed on an exterior surface of said gas flow tube for reducing a microwave power loss through said gas flow tube, said grounded shield having a hole for receiving the gas flow therethrough.

11. A microwave plasma nozzle as defined in claim 10, further comprising:

a position holder disposed between said rod-shaped conductor and said grounded shield for securely holding said rod-shaped conductor relative to said grounded shield.

12. A microwave plasma nozzle as defined in claim 1, further comprising:

a pair of magnets disposed adjacent to an exterior surface of said gas flow tube.

13. A microwave plasma nozzle as defined in claim 12, wherein said pair of magnets has a shape approximating a portion of a cylinder.

14. A microwave plasma nozzle as defined in claim 1, further comprising:

a pair of magnets disposed adjacent to an interior surface of said gas flow tube.

15. A microwave plasma nozzle as defined in claim 14, wherein said pair of magnets has a shape approximating a portion of a cylinder.

16. A microwave plasma nozzle as defined in claim 1, further comprising:

a pair of magnets disposed adjacent to an exterior surface of said gas flow tube; and a shield disposed adjacent to an interior surface of said gas flow tube.

17. A microwave plasma nozzle as defined in claim 1, further comprising:

an anode disposed adjacent to a portion of said gas flow tube; and a cathode disposed adjacent to another portion of said gas flow tube.

18. A microwave plasma nozzle arrangement including the microwave plasma nozzle as defined in claim 1, further comprising:

the microwave cavity, and the microwave cavity having said second end of said rod-shaped conductor disposed therein.

19. A microwave plasma nozzle arrangement as defined in claim 18, wherein said microwave cavity includes a wall, and said wall of said microwave cavity forming a portion of a gas flow passage operatively connected to an inlet portion of said gas flow tube.

20. A microwave plasma nozzle arrangement including the microwave plasma nozzle as defined in claim 1, further comprising:

the microwave cavity, and the microwave cavity having said second end of said rod-shaped conductor disposed therein for receiving said microwaves, and a portion of said microwave cavity forming a gas flow passage, wherein said portion of said microwave cavity forming the gas flow passage is operatively connected to an inlet portion of said gas flow tube.

21. A microwave plasma nozzle arrangement including the microwave plasma nozzle as defined in claim 1, further comprising:

the microwave cavity, and the microwave cavity having said second end of said rod-shaped conductor disposed therein for receiving said microwaves, and said gas flow tube extending completely through said microwave cavity.

22. A microwave plasma nozzle as defined in claim 1, wherein said outlet portion of said gas flow tube has a frusto-conical shape.

23. A microwave plasma nozzle as defined in claim 1, wherein said outlet portion of said gas flow tube includes a portion having a curved cross section.

24. A microwave plasma nozzle as defined in claim 23, wherein the portion having a curved cross section includes a bell shaped section.

25. A microwave plasma nozzle as defined in claim 1, wherein said gas flow tube includes an extended guiding portion for extending plasma length and enhancing plume stability, said extended guiding portion being attached to the outlet portion of said gas flow tube.

26. A microwave plasma nozzle as defined in claim 1, wherein said as gas flow tube includes a plume modifying portion for causing a plasma plume to have a generally narrow strip geometry, said plume modifying portion being attached to the outlet portion of said gas flow tube.

27. A microwave plasma nozzle as defined in claim 1, wherein said gas flow tube includes a plume expanding portion for expanding a cross-sectional dimension of a plasma plume, said plume expanding portion being attached to the outlet portion of said gas flow tube.

28. A microwave plasma nozzle as defined in claim 1, wherein said rod-shaped conductor includes a portion defining an opening therein.

29. A microwave plasma nozzle as defined in claim 28, wherein said rod-shaped conductor includes two different materials.

30. A microwave plasma nozzle as defined in claim 1, wherein said rod-shaped conductor has a cross-sectional shape comprising at least one of oval, elliptical or oblong.

31. A microwave plasma nozzle as defined in claim 1, wherein said second end is tapered.

32. A microwave plasma nozzle as defined in claim 1, wherein said rod-shaped conductor includes two portions connected by a removable fastening mechanism.

33. A microwave plasma nozzle for generating plasma from microwaves provided via a microwave cavity and a gas, comprising:

a gas flow tube for having a gas flow therethrough, said gas flow tube having an outlet portion whereat gas of said gas flow is discharged;

a rod-shaped conductor disposed in said gas flow tube, said rod-shaped conductor having opposite ends, said opposite ends being a first end and a second end, said rod-shaped conductor being configured for disposition of the second end in the microwave cavity, and said rod-shaped conductor being configured so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion; and a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to the gas of said gas flow passing along said at least one passage.

34. A microwave plasma nozzle as defined in claim 33, further comprising means for reducing a microwave power loss through said gas flow tube.

35. A microwave plasma nozzle as defined in claim 33, further comprising a shield that is disposed adjacent to a portion of said gas flow tube.

36. A microwave plasma nozzle as defined in claim 33, further comprising a grounded shield disposed adjacent to a portion of said gas flow tube.

37. A microwave plasma nozzle as defined in claim 33, further comprising means for electronically exciting the gas of the gas flow through said gas flow tube.

38. A microwave plasma nozzle as defined in claim 33, further comprising a pair of magnets disposed adjacent to a portion of said gas flow tube.

39. A microwave plasma nozzle as defined in claim 33, further comprising a pair of magnets disposed adjacent to an exterior surface of said gas flow tube.

40. A microwave plasma nozzle as defined in claim 33, further comprising a pair of magnets disposed adjacent to an interior surface of said gas flow tube.

41. A microwave plasma nozzle as defined in claim 33, wherein said first end is tapered.

42. A microwave plasma nozzle as defined in claim 33, wherein said gas flow tube includes an extended guiding portion for extending plasma length and enhancing plume stability, said extended guiding portion being attached to the outlet portion of said gas flow tube.

43. A microwave plasma nozzle as defined in claim 33, wherein said as gas flow tube includes a plume modifying portion for causing a plasma plume to have a generally narrow strip geometry, said plume modifying portion being attached to the outlet portion of said gas flow tube.

44. A microwave plasma nozzle as defined in claim 33, wherein said gas flow tube includes a plume expanding portion for expanding a cross-sectional dimension of a plasma plume, said plume expanding portion being attached to the outlet portion of said gas flow tube.

45. A microwave plasma nozzle as defined in claim 33, wherein said gas flow tube is made of quartz.

46. A microwave plasma nozzle for generating plasma from microwaves provided via a microwave cavity and a gas, comprising:

a gas flow tube for having a gas flow therethrough, said gas flow tube having an outlet portion whereat gas of said gas flow is discharged;

a rod-shaped conductor disposed in said gas flow tube, said rod-shaped conductor having opposite ends, said opposite ends being a first end and a second end, said rod-shaped conductor being configured for disposition of the second end in the microwave cavity, and said rod-shaped conductor being configured so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion;

a grounded shield for reducing a microwave power loss through said gas flow tube and having a hole for receiving the gas flow therethrough, said grounded shield being disposed on an exterior surface of said gas flow tube; and a position holder disposed between said rod-shaped conductor and said grounded shield for securely holding said rod-shaped conductor relative to said grounded shield.

47. A microwave plasma nozzle as defined in claim 46, wherein said gas flow tube is secured in a recess formed along the outer perimeter of the position holder.

48. A microwave plasma nozzle as defined in claim 46, wherein said gas flow tube includes an extended guiding portion for extending plasma length and enhancing plume stability, said extended guiding portion being attached to the outlet portion of said gas flow tube.

49. A microwave plasma nozzle as defined in claim 46, wherein said as gas flow tube includes a plume modifying portion for causing a plasma plume to have a generally narrow strip geometry, said plume modifying portion being attached to the outlet portion of said gas flow tube.

50. A microwave plasma nozzle as defined in claim 46, wherein said gas flow tube includes a plume expanding portion for expanding a cross-sectional dimension of a plasma plume, said plume expanding portion being attached to the outlet portion of said gas flow tube.

51. A microwave plasma nozzle as defined in claim 46, wherein said first end is tapered.

52. A microwave plasma nozzle as defined in claim 46, wherein said gas flow tube is made of quartz.

53. A plasma generating system, comprising:

a microwave cavity having a wall forming a portion of a gas flow passage;

a gas flow tube for having a gas flow therethrough, said gas flow tube having an outlet portion whereat gas of said gas flow is discharged, said outlet portion including a dielectric material, said gas flow tube having an inlet portion connected to said microwave cavity; and a rod-shaped conductor disposed in said gas flow tube, said rod-shaped conductor having opposite ends, said opposite ends being a first end and a second end, said rod-shaped conductor being disposed so as to have the second end in the microwave cavity and said rod-shape conductor being disposed so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion.

54. A plasma generating system as defined in claim 53, further comprising means for reducing a microwave power loss through said gas flow tube.

55. A plasma generating system as defined in claim 53, further comprising a vortex guide disposed between said rod-shaped conductor and said gas flow tube, said vortex guide having at least one passage angled with respect to a longitudinal axis of said rod-shaped conductor for imparting a helical shaped flow direction around said rod-shaped conductor to the gas of the gas flow passing along said at least one passage.

56. A plasma generating system as defined in claim 53, further comprising a shield disposed within a portion of said gas flow tube.

57. A plasma generating system as defined in claim 53, further comprising a grounded shield disposed adjacent to a portion of said gas flow tube.

58. A plasma generating system as defined in claim 53, further comprising means for electronically exciting the gas of the gas flow through said gas flow tube.

59. A plasma generating system as defined in claim 53, further comprising a pair of magnets disposed adjacent to a portion of said gas flow tube.

60. A plasma generating system as defined in claim 53, further comprising a pair of magnets disposed adjacent to an exterior surface of said gas flow tube.

61. A plasma generating system as defined in claim 53, further comprising a pair of magnets disposed adjacent to an interior surface of said gas flow tube.

62. A plasma generating system as defined in claim 53, wherein said first end is tapered.

63. A plasma generating system, comprising:

a microwave cavity;

a gas flow tube for having a gas flow therethrough, said gas flow tube having an outlet portion whereat gas of said gas flow is discharged, said outlet portion including a dielectric material;

a rod-shaped conductor disposed in said gas flow tube, said rod-shaped conductor having opposite ends, said opposite ends being a first end and a second end, said rod-shaped conductor being disposed so as to have the second end in the microwave cavity and said rod-shape conductor being disposed so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion;

a grounded shield coupled to the microwave cavity and configured to reduce a microwave power loss through said gas flow tube, said grounded shield having a hole for receiving the gas flow therethrough and being disposed on an exterior surface of said gas flow tube; and a position holder disposed between said rod-shaped conductor and said grounded shield for securely holding the rod-shaped conductor relative to the grounded shield.

64. A microwave plasma nozzle for generating plasma from microwaves provided via a microwave cavity and a gas, comprising:

a gas flow tube for having a gas flow therethrough, said gas flow tube having an outlet portion whereat gas of said gas flow is discharged, and said outlet portion including a non-conducting material; and a rod-shaped conductor disposed in said gas flow tube, said rod-shaped conductor having opposite ends, said opposite ends being a first end and a second end, said rod-shaped conductor being configured for disposition of the second end in the microwave cavity, and said rod-shaped conductor being configured so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion.

65. A microwave plasma nozzle as defined in claim 64, wherein said outlet portion of said gas flow tube includes a conducting material.

66. A microwave plasma nozzle for generating plasma from microwaves provided via a microwave cavity and a gas, comprising:

a gas flow tube for having a gas flow therethrough, said gas flow tube having an outlet portion whereat gas of said gas flow is discharged, and said outlet portion including a conducting material; and a rod-shaped conductor disposed in said gas flow tube, said rod-shaped conductor having opposite ends, said opposite ends being a first end and a second end, said rod-shaped conductor being configured for disposition of the second end in the microwave cavity, and said rod-shaped conductor being configured so as to receive microwaves at the second end and transmit the received microwaves along a surface of the rod-shaped conductor to the first end, the first end being arranged so as to focus and discharge said microwaves at the first end to effect plasma generation at the first end, and said first end being disposed proximate to said outlet portion of said gas flow tube so as to be a closest one of said opposite ends to said outlet portion.

* * * * *